(12) United States Patent
Abrahamsen et al.

(10) Patent No.: US 7,173,811 B2
(45) Date of Patent: Feb. 6, 2007

(54) POWER CIRCUIT BREAKERS WITH OFFSET VERTICAL QUICK DISCONNECT ADAPTERS TO ALLOW PLUGGING ONTO A LINE AND A LOAD BUS IN DIFFERENT PLANES

(75) Inventors: Michael Howard Abrahamsen, Hendersonville, NC (US); Neal Edward Rowe, Asheville, NC (US); Stanley Ervin Moore, Weaverville, NC (US); Timothy Fair, Boiling Springs, SC (US); Marlyce Jean Scott, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 295 days.

(21) Appl. No.: 10/880,908

(22) Filed: Jun. 30, 2004

(65) Prior Publication Data

US 2006/0002056 A1    Jan. 5, 2006

(51) Int. Cl.
*H02B 1/20* (2006.01)
*H02B 1/04* (2006.01)

(52) U.S. Cl. .................. 361/652; 361/611; 361/624; 361/628; 361/640; 361/673; 200/50.32; 200/284; 335/202

(58) Field of Classification Search .............. 361/606, 361/608, 611, 624, 628, 639–640, 652, 656, 361/670; 200/50.17, 50.2, 50.21, 50.23, 200/50.32, 284; 174/68.2, 70 B, 71 B, 72 B, 174/99 B, 149 B; 335/202

See application file for complete search history.

(56) References Cited

U.S. PATENT DOCUMENTS

| | | | | |
|---|---|---|---|---|
| 2,997,627 A | * | 8/1961 | Ellegood | 361/614 |
| 3,562,593 A | * | 2/1971 | Bould | 361/614 |
| 3,746,817 A | * | 7/1973 | Drown et al. | 200/307 |
| 3,786,313 A | * | 1/1974 | Coles et al. | 361/644 |
| 4,413,307 A | * | 11/1983 | Butte et al. | 361/675 |
| 4,752,233 A | * | 6/1988 | Morby et al. | 439/212 |
| 5,011,421 A | * | 4/1991 | Duke et al. | 439/213 |
| 5,053,918 A | * | 10/1991 | Norden | 361/640 |
| 5,124,881 A | * | 6/1992 | Motoki | 361/605 |
| 6,018,455 A | | 1/2000 | Wilkie, II et al. | |
| 6,040,976 A | | 3/2000 | Bruner et al. | |
| 6,111,745 A | | 8/2000 | Wilkie, II et al. | |
| 6,215,654 B1 | | 4/2001 | Wilkie, II et al. | |

* cited by examiner

*Primary Examiner*—Michael Datskovsky
*Assistant Examiner*—Robert J. Hoffberg
(74) *Attorney, Agent, or Firm*—Martin J. Moran

(57) ABSTRACT

An offset assembly for a circuit breaker includes at least one two plane member having a first plate and a second plate. The first and second plates are joined at an edge and extend generally perpendicular to each other. The second plate is structured to be coupled to the quick disconnect and the first plate is structured to be coupled to the circuit breaker terminal so that the second plate is not aligned with the centerline of the circuit breaker terminal.

21 Claims, 6 Drawing Sheets

POWER CIRCUIT BREAKERS WITH OFFSET VERTICAL QUICK DISCONNECT ADAPTERS TO ALLOW PLUGGING ONTO A LINE AND A LOAD BUS IN DIFFERENT PLANES

BACKGROUND OF THE INVENTION

1. Field of the Invention

The present invention relates to a circuit breaker having vertically aligned line and load terminals coupled to quick disconnects structured to engage a bus assembly having vertical risers interspersed with horizontal runbacks and, more specifically, to an offset assembly structured to be couple to the line and load terminals to align the quick disconnects with the alternating vertical risers and horizontal runbacks.

2. Background Information

Low voltage circuit breakers used in electric power distribution systems are commonly mounted in a housing assembly and supported on rollers which permit easy installation and removal of the sizeable circuit breakers required for such service. The housing assembly has walls forming an enclosure and a bus assembly. The bus assembly includes line and load conductors for each pole of the circuit breaker. Each line conductor, or "riser," is, essentially, an elongated conductor bar with the longitudinal axis extending vertically through the housing assembly. That is, the vertical riser typically extends both above and below the circuit breaker so that other components may be coupled to the vertical riser. Because the vertical riser extends both above and below the circuit breaker, the load conductors must be offset relative to the vertical risers. The load conductors, or "runbacks," are elongated conductive bars extending from the back of the housing assembly toward the front of the housing assembly. The runbacks are typically interspersed, and offset laterally, with the line conductors. The conductor bars are structured to be engaged by quick disconnects, which are coupled to terminals on the back of the circuit breaker, as the circuit breaker is moved into the housing assembly.

As discussed herein, and as shown in the Figures, the circuit breaker is a three-pole circuit breaker, however, it is understood that the invention may be practiced with a circuit breaker having any number of poles. Where the circuit breaker is a three pole circuit breaker, the bus assembly includes six conductors—three line conductors and three load conductors. A non-conductive shroud is disposed about the bus assembly conductors to provide support and resist accidental contact between the line and load sides of the circuit.

The circuit breaker includes one pair of terminals for each pole of the circuit breaker. The terminals include a line terminal and a load terminal. The terminals are, typically, horizontally flat members made from a conductive material. Additionally, the line terminal is normally disposed directly above the load terminal. In order to couple the circuit breaker to each conductor in the bus assembly, the quick disconnects must be aligned with the vertical risers and runbacks.

To enable the circuit breaker to engage the bus assembly, the issue of alignment of the quick disconnects with the bus assembly conductors has been addressed as follows. One solution has been to have the vertical risers and runbacks vertically aligned. That is, the vertical riser has been adapted to include an opening to allow a runback to extend therethrough. Where the vertical riser has a suitable shape, for example, a U-shape, the vertical riser bight may have an opening therethrough. In this configuration, the runbacks are not offset from the vertical risers and instead pass through the opening. Thus, a quick disconnect coupled to a vertically aligned pair of terminals would also be aligned with the vertically aligned vertical risers and runbacks. This design, however, incurs more production costs than the use of a solid riser and is prone to overheating where the cross-sectional area of the vertical riser is reduced.

Moreover, as noted above, a typical bus assembly included runbacks that extend in between, or, as to the last runback in the assembly, to one side of, the vertical risers. As such, the conductors in the bus assembly are not typically aligned vertically. Thus, the circuit breaker could be structured with offset terminals. However, as also noted above, a typical circuit breaker has the line terminal and load terminal for one pole of the circuit breaker aligned vertically. Thus, as shown in U.S. Pat. No. 6,040,976, to couple each terminal of a circuit breaker to a conductor, a bent stab device and a set back conductor were utilized. That is, either the line or load terminals of the circuit breaker were aligned with the appropriate type of conductor. For example, the load terminals were aligned with the load conductors. The other terminals, in this example the line terminals, had a bent stab coupled thereto. The bent stab had an elongated length which included an angled medial portion. To provide room for the length of the bent stab, the vertical riser was set back in the housing. Thus, the circuit breaker load terminal quick disconnects were coupled directly to a runback whereas the circuit breaker line terminal quick disconnects were coupled to the bent stab. The bent stab provided the offset to allow the circuit breaker line terminal to be coupled to the vertical riser. This configuration has the disadvantage of requiring the vertical riser to be set back in the housing. As bus assemblies typically have the front edge of the vertical risers and runbacks laterally aligned, the bent stab device may not be used with many bus assemblies. Moreover, as only one set of conductors is set back, the bent stab may not be used on the terminal coupled to the forward conductors.

There is, therefore, a need for an offset assembly for a circuit breaker structured to be used with a bus assembly wherein the front edge of the vertical risers and the runbacks are laterally aligned.

There is a further need for an offset assembly for a circuit breaker that may be used on both the load terminals and the line terminals.

There is a further need for an offset assembly for a circuit breaker that is structured to be coupled to existing circuit breakers and bus assemblies.

SUMMARY OF THE INVENTION

These needs, and others, are met by the present invention which provides an offset assembly for a circuit breaker having a two plane member. The two plane member has a first plate, which is structured to be coupled to a circuit breaker terminal and a second plate, which is structured to be coupled to a quick disconnect. The first and second plates are generally perpendicular to each other. Given the orientation of a circuit breaker described below, the first plate extends in a generally horizontal plane and the second plate extends in a generally vertical plane. The two plane member may also have a brace disposed between the first and second plates. The brace extends in a plane generally perpendicular to both the first and second plates. Thus, the first plate, second plate and brace are mutually orthogonal.

The circuit breaker is, preferably, a three-pole circuit breaker having three pairs of line and load terminals. The line and load terminals in each pair are generally vertically aligned. Additionally, the pairs of terminals are generally evenly spaced apart. The spacing between the centerline of adjacent pairs of terminals is hereinafter referred to as a "pole spacing unit." The circuit breaker is structured to be mounted in a housing assembly and supported on rollers which permit easy installation and removal of the circuit breaker in the housing assembly. The circuit breaker terminals are structured to be coupled, via the offset assembly, to quick disconnects. The quick disconnects are structured to engage the bus assembly as the circuit breaker is moved into the housing assembly.

The bus assembly is mounted in the housing assembly. The bus assembly includes three vertical risers and three runbacks. The vertical risers are made from a generally flat conductive material, such as, but not limited to, a copper bar. The longitudinal axis of the vertical riser extends vertically through the housing assembly. The vertical riser extends from below the circuit breaker to a point above the circuit breaker. The lateral axis of the vertical riser extends, generally, from the front to the back of the housing assembly. The runbacks are also made from a generally flat conductive material, such as, but not limited to, a copper bar. The runback longitudinal axis extends, generally, from the front to the back of the housing assembly. The runback lateral axis extends, generally, vertically within the housing. Both the vertical risers and runbacks have a front edge. The front edge of the vertical risers and the runbacks are, generally, laterally aligned within the housing assembly. The centerlines of the vertical risers are generally spaced apart by one pole spacing unit. The centerlines of the runbacks are also generally spaced apart by one pole spacing unit. The runbacks extend in between or, as to the last runback in the bus assembly, to one side of, the vertical risers. The runbacks are, preferably, evenly spaced between the vertical risers. Thus, as the point where the runbacks are disposed between the vertical risers, the bus assembly conductors are spaced about one-half of a pole spacing unit apart.

The two plane member second plate and first plate each have a centerline. The distance between the two plane member second plate and first plate centerline is about one quarter of a pole spacing unit. Thus, the distance between the second plate centerlines of a pair of two plane members installed on vertically aligned terminals where one two plane member has the second plate disposed to the right and the other two plane member has the second plate disposed to the left is about one-half of a pole spacing unit apart.

When installed on the circuit breaker terminals, each two plane member coupled to a line terminal has a second plate that is disposed on one side of the terminal and each two plane member coupled to a load terminal has a second plate that disposed on the opposite side of the terminal. In this configuration, the centerline of the second plates on the L-shaped connectors on the line terminals are about one-half of a pole spacing unit apart from the centerline of the first plates on the L-shaped connectors on the load terminals. Accordingly, when the circuit breaker is positioned with the centerline of the terminals aligned about half the distance between adjacent vertical risers and runbacks, the second plate of a two plane member coupled to a line terminal is aligned with a vertical riser and the first plate of a two plane member coupled to a load terminal is aligned with a runback. Thus, when the quick disconnects are disposed on each second plate, a circuit breaker having vertically aligned terminals may be coupled to a bus assembly having interspersed vertical risers and runbacks with laterally aligned front edges.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
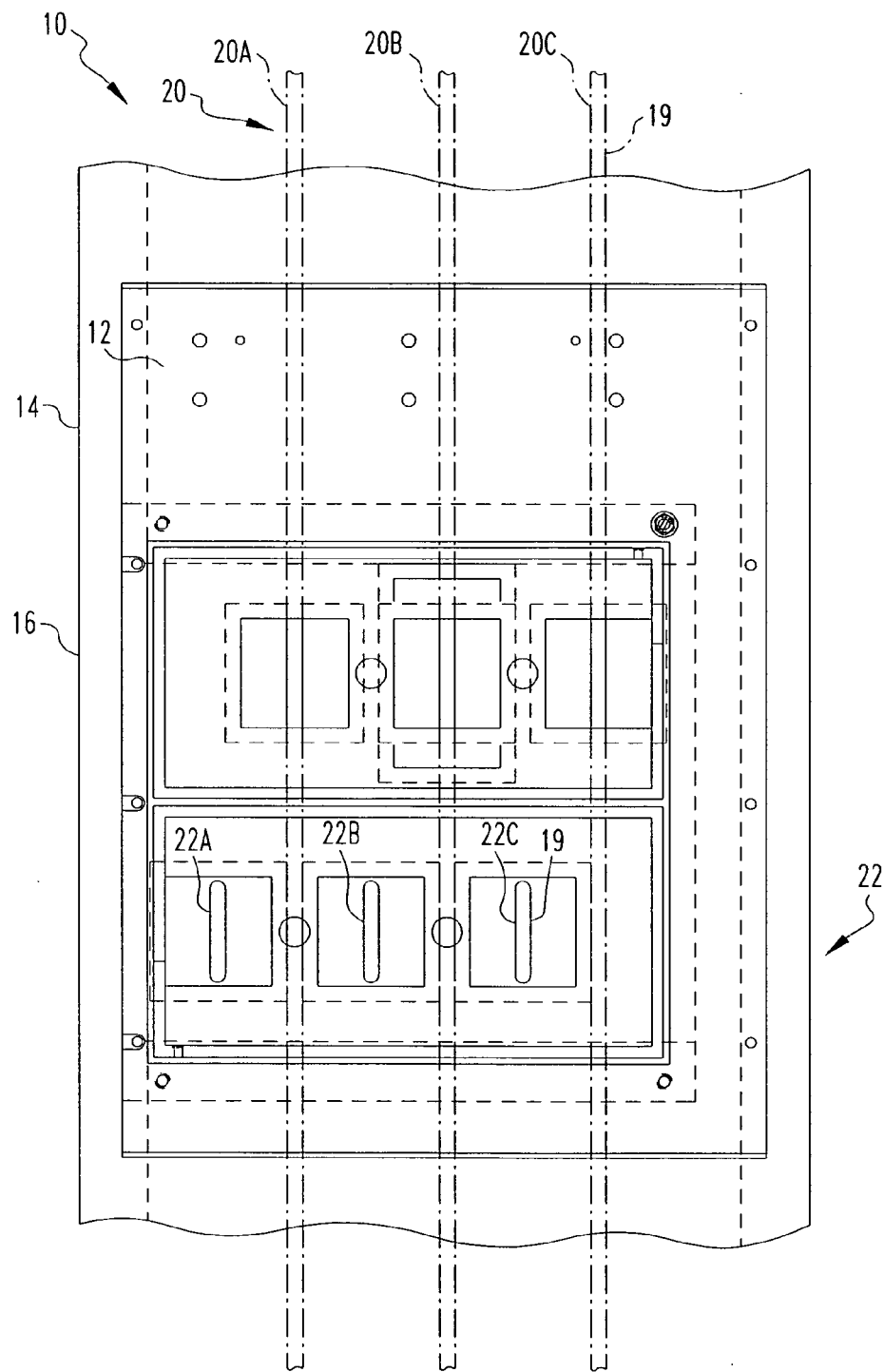
FIG. 1 is a partial schematic front view of a circuit breaker in a housing assembly.
Figure 2:
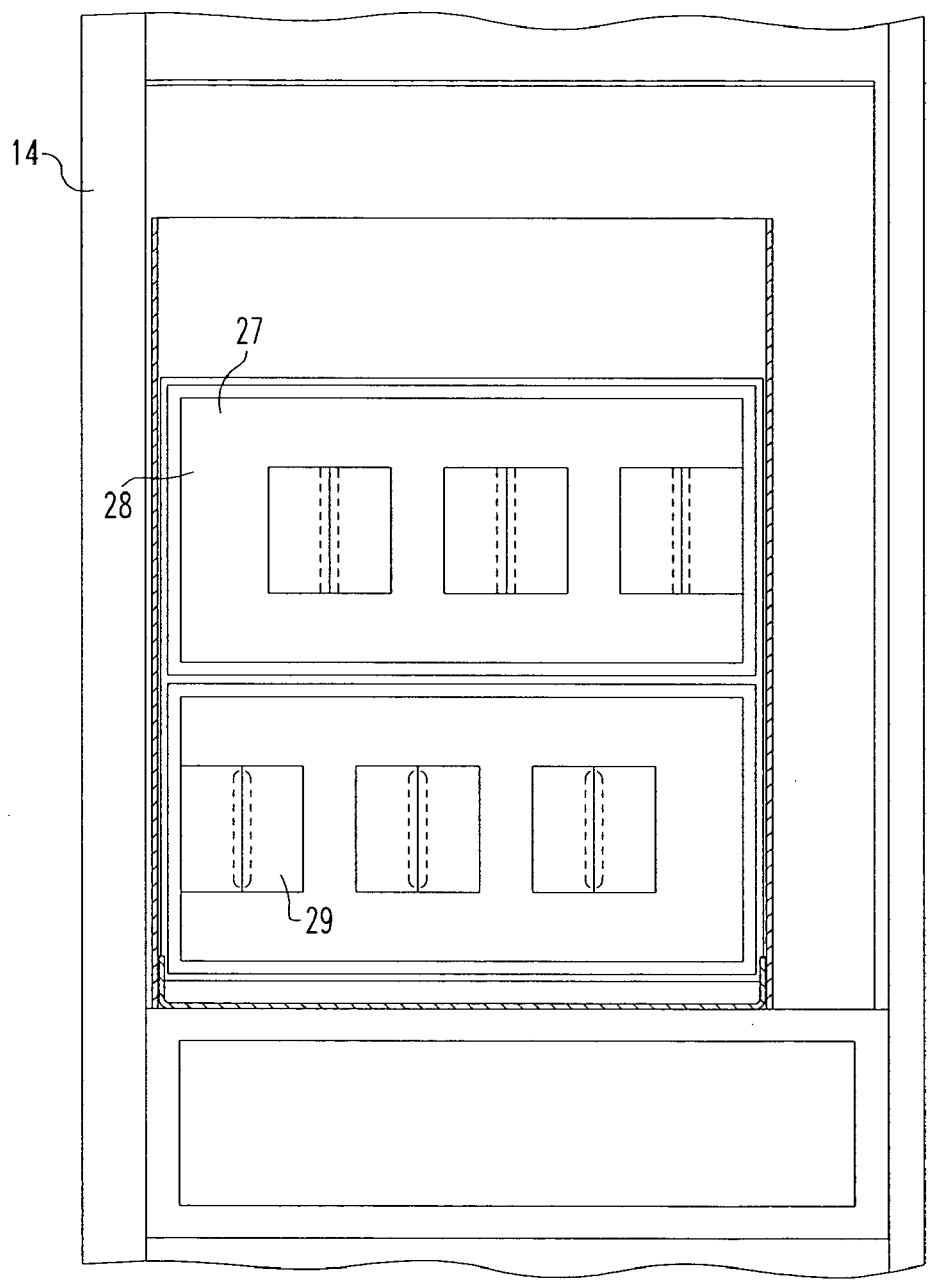
FIG. 2 is a partial schematic front view of a housing assembly.
Figure 3:
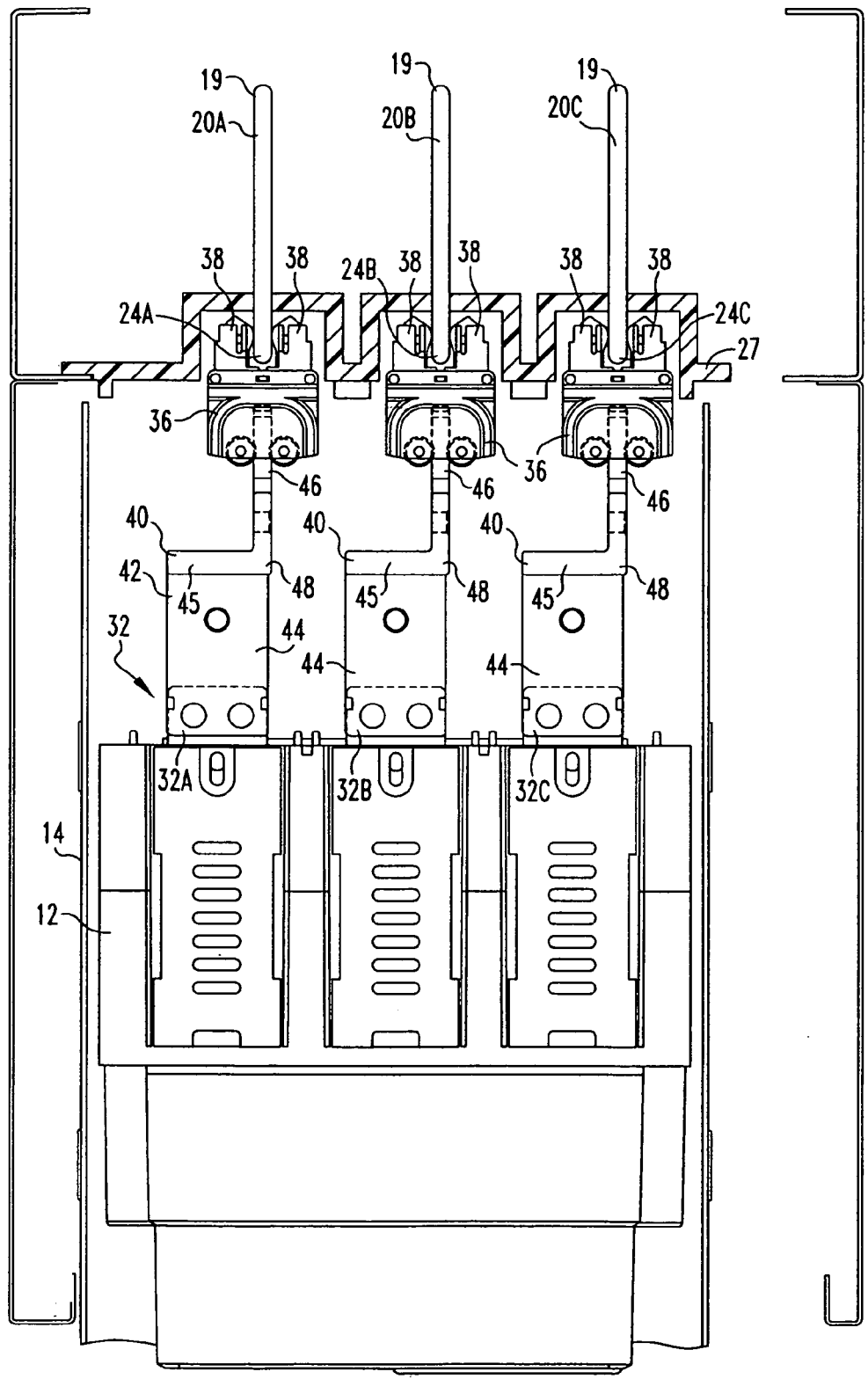
FIG. 3 is a partial top view of circuit breaker with the line terminals coupled to the bus assembly vertical risers.

As shown in FIG. 1, a power circuit breaker assembly 10 includes a circuit breaker 12 and a housing assembly 14. The housing assembly 14 includes outer walls 16 structured to enclose the circuit breaker 12, a bus assembly 18, and a non-conductive shroud (FIG. 2). The bus assembly 18 includes a plurality of conductive members 19 including at least one vertical riser 20 and at least one runback 22. Where the circuit breaker 12 is a three-pole circuit breaker, as is preferred, the bus assembly 18 includes three vertical risers 20A, 20B, 20C and three runbacks 22A, 22B, 22C. The vertical risers 20A, 20B, 20C are made from an elongated, generally flat conductive material, such as, but not limited to, a copper bar. The longitudinal axis of each vertical riser 20A, 20B, 20C extends vertically through the housing assembly 14. The vertical riser 20A, 20B, 20C extends from below the circuit breaker 12 to a point above the circuit breaker 12. The lateral axis of each vertical riser 20A, 20B, 20C extends, generally, from the front to the back of the housing assembly 14. The runbacks 22A, 22B, 22C are also made from an elongated, generally flat conductive material, such as, but not limited to, a copper bar. Each runback 22A, 22B, 22C longitudinal axis extends, generally, from the front to the back of the housing assembly 14. Each runback 22A, 22B, 22C lateral axis extends, generally, vertically within the housing assembly 14. As shown in FIG. 3, each vertical riser 20A, 20B, 20C and runback 22A, 22B, 22C has a front edge 24A, 24B, 24C, 26A, 26B, 26C, respectively. Each front edge 24A, 24B, 24C, 26A, 26B, 26C is generally, laterally aligned within the housing assembly 14. That is, each front edge 24A, 24B, 24C, 26A, 26B, 26C is about the same distance from the back of the housing assembly 14. Additionally, as shown in FIG. 1, the vertical risers 20A, 20B, 20C and runbacks 22A, 22B, 22C alternate laterally across the housing assembly 14 with a vertical riser 20A, 20B, 20C disposed to the right of each runback 22A, 22B, 22C. Thus, at the location where the runbacks 22A, 22B, 22C extend between the vertical risers 20A, 20B, 20C, the conductors 19 are disposed adjacent to and laterally spaced from each other.

The centerline of the vertical risers 20A, 20B, 20C are generally spaced apart by one pole spacing unit (discussed below). The centerline of the runbacks 22A, 22B, 22C are also generally spaced apart by one pole spacing unit. The runbacks 22A, 22B that extend in between the vertical risers 20A, 20B, or, as to the last runback 22C in the bus assembly 18, to one side of, the vertical riser 20C. The runbacks 22A, 22B, 22C are, preferably, evenly spaced between the vertical risers 20A, 20B, 20C. Thus, where the runbacks 22A, 22B, 22C are disposed between the vertical risers 20A, 20B, 20C, the bus assembly conductors 19 are spaced about one-half of a pole spacing unit apart.

As shown in FIG. 2, the housing assembly 14 includes a shroud assembly 27 disposed between the circuit breaker 12 and the bus assembly 18. The shroud assembly 27 is made from a non-conductive material, such as, but not limited to, plastic. The shroud assembly 27 includes a base member 28 and one or more door members 29. The base member 28 includes openings aligned with each vertical riser 20A, 20B, 20C and runback 22A, 22B, 22C. The door members 29 are structured to cover the openings. The door members 29 are biased to a closed position by a spring (not shown) or other such means. As described below, as the circuit breaker 12 is moved into the housing assembly 14, the quick disconnects 36 push the door members 29 aside so that the quick disconnects 36 may engage the vertical risers 20A, 20B, 20C and runbacks 22A, 22B, 22C. The shroud assembly 27 is, preferably, structured to support the vertical risers 20A, 20B, 20C. That is, the shroud assembly 27 includes gaps 25 (FIG. 4) structured to snugly engage the vertical risers 20A, 20B, 20C.

Figure 4:
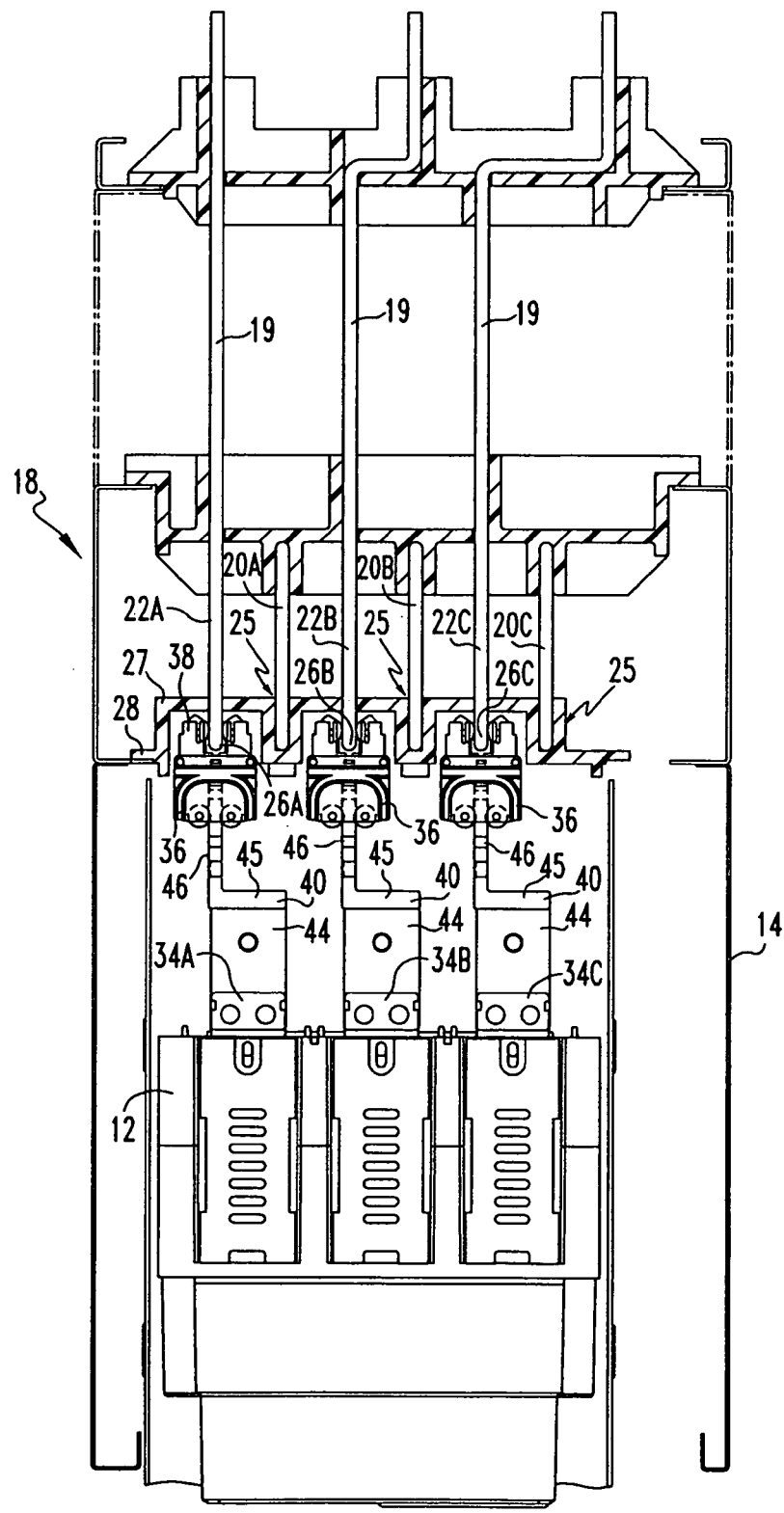
FIG. 4 is a top view of circuit breaker with the load terminals coupled to the bus assembly runbacks.
Figure 5:
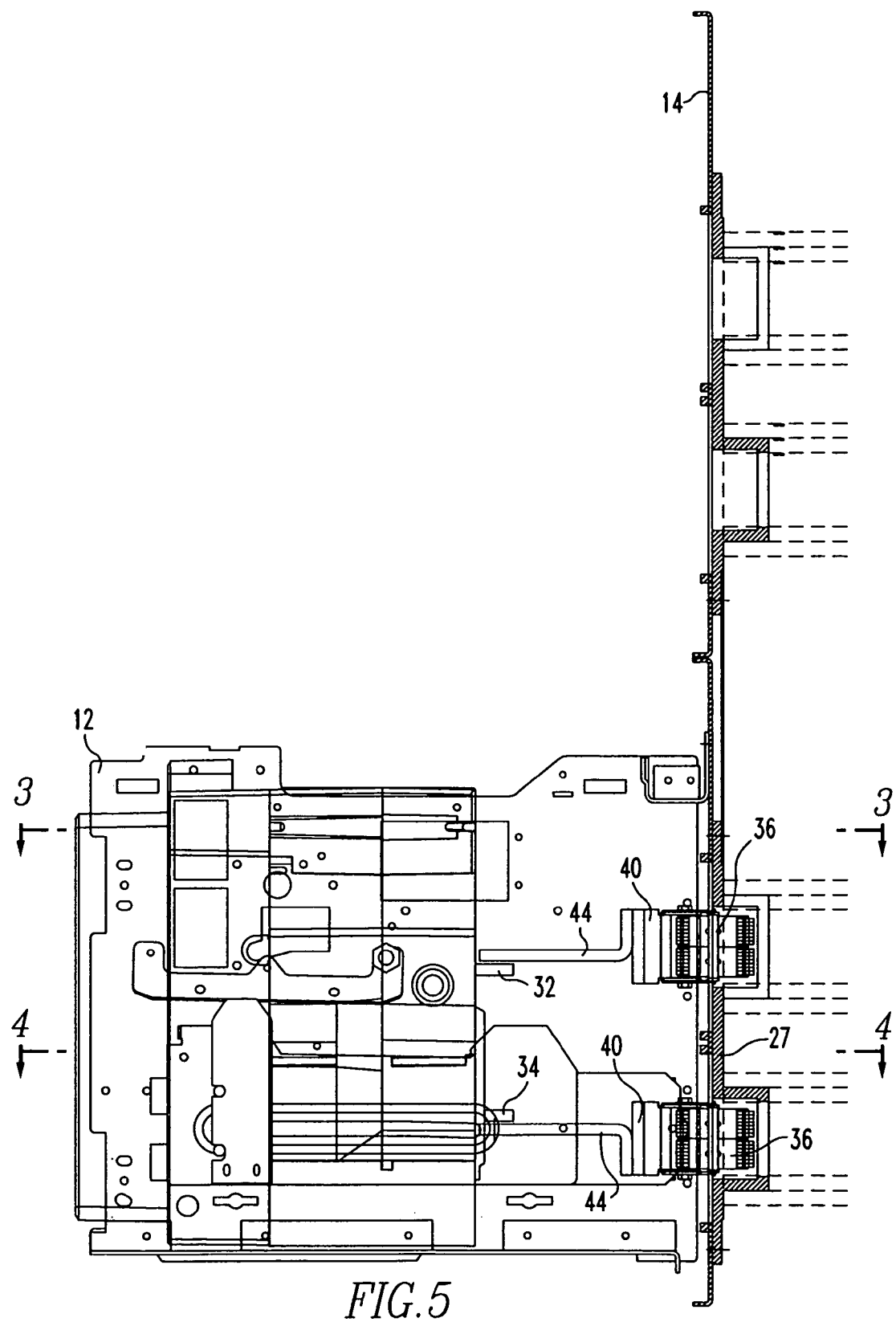
FIG. 5 is a side view of circuit breaker with the line terminals coupled to the bus assembly vertical risers and the load terminals coupled to the bus assembly runbacks.

As shown in FIG. 3–5, the circuit breaker 12 has a housing assembly 14 structured to enclose at least one pair of separable contacts, a trip mechanism and an operating mechanism, as is known in the prior art. The separable contacts are coupled to external terminals 32, 34. There is at least one line terminal 32 and at least one load terminal 34 (FIG. 4) extending from the circuit breaker housing assembly 30. The terminals 32, 34 are, preferably, horizontal, flat tabs made from a conductive material. Each terminal has a centerline. A three-pole circuit breaker 12 has three pairs of line terminals 32A, 32B, 32C and load terminals 34A, 34B, 34C. The line terminals 32A, 32B, 32C and load terminals 34A, 34B, 34C in each pair of terminals are generally vertically aligned. That is, the centerline of the line terminal 32A, 32B, 32C is disposed generally directly above the centerline of the associated load terminal 34A, 34B, 34C. Additionally, the line terminals 32A, 32B, 32C and load terminals 34A, 34B, 34C are generally evenly spaced apart. The spacing between the centerline of adjacent pairs of line terminals 32A, 32B, 32C and load terminals 34A, 34B, 34C is hereinafter referred to as a "pole spacing unit." The circuit breaker 12 is structured to be mounted in the housing assembly 14 and supported on rollers which permits easy installation and removal of the circuit breaker 12 in the housing assembly 14. Thus, the circuit breaker 12 is structured to move between a first and second position. In the first position the circuit breaker 12 is outside said housing assembly 14 and in the second position the circuit breaker 12 is inside the housing assembly 14 with the circuit breaker 12 coupled to the bus assembly 18.

The circuit breaker line terminals 32A, 32B, 32C and load terminals 34A, 34B, 34C are structured to be coupled, via an offset assembly 40 (discussed below), to quick disconnects 36. As is known in the art, the quick disconnects 36 are structured to engage the bus assembly 18 conductive members 19 as the circuit breaker 12 is moved into the housing assembly 14. The quick disconnects 36 each have at least one pair of fingers 38 structured to close in a pincer-like manner, and which are biased to a closed position.

Figure 6A:
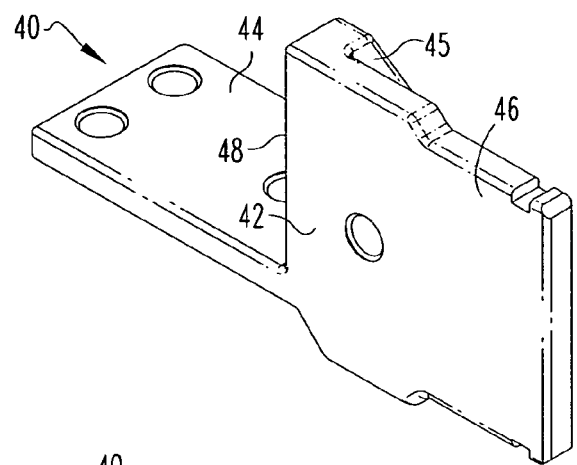
FIG. 6A is an isometric view of a two plane member.
Figure 6B:
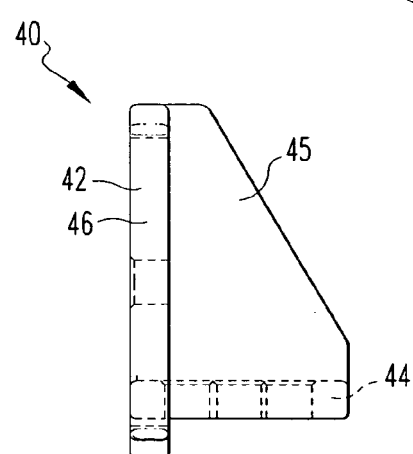
FIG. 6B is an end view of a two plane member.

As shown in FIG. 6, the offset assembly 40 includes at least one two plane member 42 having a first plate 44 and a second plate 46. The first and second plates 44, 46 are joined at a generally linear edge 48 and extend generally perpendicular to each other. The second plate 46 is structured to be coupled to a quick disconnect 36. The quick disconnect 36 is coupled to the second plate 46 so that the fingers 38 are oriented to close in a horizontal direction. Thus, the fingers 38 are structured to engage the vertical risers 20A, 20B, 20C and runbacks 22A, 22B, 22C. The second plates 46 have a longitudinal axis that extends in the direction of travel of the circuit breaker 12. Hereinafter, the second plate 46 longitudinal axis is referred to as a "centerline." The first plate 44 is structured to be coupled to either the circuit breaker line terminals 32A, 32B, 32C or load terminals 34A, 34B, 34C. The first plate 44 may be coupled to the circuit breaker line terminals 32A, 32B, 32C or load terminals 34A, 34B, 34C with the second plate 46 being disposed on either the right side or the left side of the circuit breaker line terminals 32A, 32B, 32C or load terminals 34A, 34B, 34C. Preferably, the first plate 44 has a length corresponding to the width of the circuit breaker line terminals 32A, 32B, 32C and load terminals 34A, 34B, 34C. Thus, the medial lateral axis on the first plate 44 corresponds to the centerline of the circuit breaker line terminals 32A, 32B, 32C and load terminals 34A, 34B, 34C. Hereinafter, the medial point of the first plate 44 is referred to as the centerline of the first plate 44. It is understood, however, that the first plate 44 may have a length that is different than the width of the circuit breaker line terminals 32A, 32B, 32C and load terminals 34A, 34B, 34C. In this configuration, the "centerline" of the first plate 44 still corresponds to the centerline of the circuit breaker line terminals 32A, 32B, 32C and load terminals 34A, 34B, 34C.

The first and second plates 44, 46 may be further supported by a brace 45. The brace 45 is disposed between the first and second plates 44, 46 and extends in a direction generally orthogonal to both the first and second plates 44, 46. Given the orientation of a circuit breaker 12 described above, the first plate 44 extends in a generally horizontal plane and the second plate 46 extends in a generally vertical plane. The brace 45 extends in a plane generally lateral plane. Thus, the first plate 44, second plate 46 and brace 45 are mutually orthogonal.

The distance between the two plane member first plate 44 and second plate 46 centerline is about one quarter of a pole spacing unit. Thus, the distance between the second plate 46 centerlines of the two plane members 42 installed on vertically aligned line terminals 32A, 32B, 32C and load terminals 34A, 34B, 34C, where one two plane member 42 has the second plate 46 disposed to the right and the other two plane member has the second plate 46 disposed to the left, is about one-half of a pole spacing unit apart.

As shown in FIGS. 3 and 4, the offset assembly 40 includes one two plane member 42 for each line terminal 32A, 32B, 32C and load terminal 34A, 34B, 34C. Thus, in a three-pole circuit breaker 12, the offset assembly 40 includes six separate two plane members 42. Each of the two plane members 42 are generally identical (and are not further identified by separate reference numbers). This is an advantage as the two plane members 42 may be used interchangeably on either line or load terminals 32, 34. When installed, each two plane member 42 coupled to a line terminal 32A, 32B, 32C has a second plate 46 that is disposed to the right of the terminal 32A, 32B, 32C. As shown on FIG. 4, each two plane member 42 coupled to a load terminal 34A, 34B, 34C has a second plate 46 that disposed on the left side of the load terminal 34A, 34B, 34C. In this configuration, the centerline of the second plates 46 on the two plane member 42 on the line terminals 32A, 32B, 32C are about one-half of a pole spacing unit apart from the centerline of the second plates 46 of the two plane members 42 on the load terminals 34A, 34B, 34C.

Accordingly, when the circuit breaker 12 is positioned with the centerline of the line terminals 32A, 32B, 32C and load terminals 34A, 34B, 34C aligned about half the distance between adjacent vertical risers 20A, 20B, 20C and runbacks 22A, 22B, 22C, the second plate 46 of a two plane member 42 coupled to a line terminal 32A, 32B, 32C is aligned with a vertical riser 20A, 20B, 20C and the second plate 46 of a two plane member 42 coupled to a load terminal 34A, 34B, 34C is aligned with a runback 22A, 22B, 22C. Thus, when the quick disconnects 36 are disposed on each second plate 46, a circuit breaker 12 having vertically aligned line terminals 32A, 32B, 32C and load terminals 34A, 34B, 34C may be coupled to a bus assembly 18 having interspersed vertical risers 20A, 20B, 20C and runbacks 22A, 22B, 22C with a laterally aligned front edge 24A, 24B, 24C, 26A, 26B, 26C.

Figure 7:
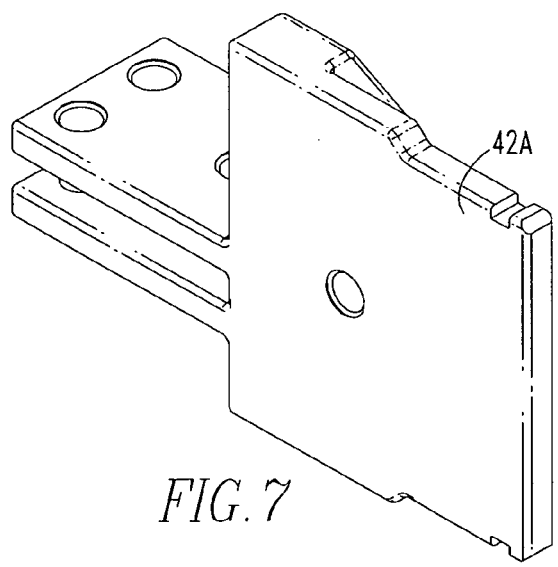
FIG. 7 is an isometric view of an alternate two plane member.

While specific embodiments of the invention have been described in detail, it will be appreciated by those skilled in the art that various modifications and alternatives to those details could be developed in light of the overall teachings of the disclosure. For example, as shown in FIG. 7, the two plane member 42A may have a second horizontal plate structured to be coupled to a terminal 32. Accordingly, the particular arrangements disclosed are meant to be illustrative only and not limiting as to the scope of invention which is to be given the full breadth of the claims appended and any and all equivalents thereof.

What is claimed is:

1. An offset assembly for a circuit breaker, said circuit breaker having one or more pairs of circuit breaker terminals, each said terminal having a centerline and said terminal centerlines being vertically aligned with each other, said circuit breaker further structured to be coupled to a bus assembly by a quick disconnect, said bus assembly having at least one pair of conductors, said conductors including a vertical riser and a runback, said vertical riser and runback each having a front edge disposed adjacent to and laterally aligned with each other, said offset assembly comprising:
   at least one two plane member having a first plate and a second plate, said first and second plates joined at an edge and extending generally perpendicular to each other;
   said first plate structured to be coupled to said circuit breaker terminal so that said second plate is not aligned with the centerline of said circuit breaker terminal; and
   said second plate structured to be coupled to said quick disconnect.

2. The offset assembly for a circuit breaker of claim 1, wherein said bus assembly is disposed within a housing assembly, said circuit breaker structured to move between a first and second position, said first position being outside said housing assembly and said second position being within said housing assembly with said circuit breaker coupled to said bus assembly, said circuit breaker pair of terminals includes a line terminal and a load terminal, and wherein:
   said at least one two plane member includes two separate two plane members;
   one said two plane member structured to be coupled to said line terminal such that said line terminal two plane member second plate is aligned with said vertical riser; and
   the other said two plane member structured to be coupled to said load terminal such that said load terminal two plane member second plate is aligned with said runback.

3. The offset assembly for a circuit breaker of claim 2, wherein said two plane members are generally identical.

4. The offset assembly for a circuit breaker of claim 1, wherein said circuit breaker is a three-pole circuit breaker having three pairs of line and load terminals, each said line terminal generally vertically aligned with an associated load terminal, each pair of line and load terminals is about one pole spacing unit apart from an adjacent pair of line and load terminals, said bus assembly having three vertical risers and three runbacks, each said vertical riser about one pole spacing unit apart from an adjacent vertical riser, each said runback about one pole spacing unit apart from an adjacent runback, wherein said vertical riser and runback front edges are in an alternating pattern so that each said front edge is about one-half a pole spacing unit apart, and wherein:
   said at least one two plane member includes six separate two plane members;
   one said two plane member structured to be coupled to each said line terminal such that said each line terminal two plane member second plate is aligned with one said vertical riser; and
   one said two plane member structured to be coupled to each said load terminal such that each said load terminal two plane member second plate is aligned with one said runback.

5. The offset assembly for a circuit breaker of claim 4, wherein said two plane members are generally identical.

6. The offset assembly for a circuit breaker of claim 5, wherein
   each said two plane member second plate has a centerline and each said two plane member first plate has a centerline; and
   said two plane member second plate centerline and first plate centerline are spaced by about one quarter of a pole spacing unit.

7. The offset assembly for a circuit breaker of claim 4, wherein
   each said two plane member second plate has a centerline and each said two plane member first plate has a centerline; and
   said two plane member second plate centerline and first plate centerline are spaced by about one quarter of a pole spacing unit.

8. A circuit breaker having an offset assembly, said circuit breaker structured to be coupled to a bus assembly by a quick disconnect, said bus assembly having at least one pair of conductors, said conductors including a vertical riser and a runback, said vertical riser and runback each having a front edge disposed adjacent to and laterally aligned with each other, said circuit breaker having an offset assembly comprising:
   a circuit breaker having one or more pairs of circuit breaker terminals, each said terminal having a centerline and said terminal centerlines being vertically aligned with each other;
   at least one two plane member having a second plate and a first plate, said first and second plates joined at a edge and extending generally perpendicular to each other;
   said second plate structured to be coupled to said quick disconnect;
   said first plate structured to be coupled to said circuit breaker terminal so that said second plate is not aligned with the centerline of said circuit breaker terminal;

a quick disconnect coupled to said second plate, said quick disconnect structured to engage a bus assembly conductor; and said first plate coupled to a terminal.

9. The circuit breaker having an offset assembly of claim 8, wherein said bus assembly is disposed within a housing assembly, and wherein:

said circuit breaker structured to move between a first and second position, said first position being outside said housing assembly and said second position being within said housing assembly with said circuit breaker coupled to said bus assembly;

said circuit breaker pair of terminals includes a line terminal and a load terminal;

said at least one two plane member includes two separate two plane members;

one said two plane member structured to be coupled to said line terminal such that said line terminal two plane member second plate is aligned with said vertical riser; and the other said two plane member structured to be coupled to said load terminal such that said load terminal two plane member second plate is aligned with said runback.

10. The circuit breaker having an offset assembly of claim 9, wherein said two plane members are generally identical.

11. The circuit breaker having an offset assembly of claim 8, wherein said bus assembly has three vertical risers and three runbacks, each said vertical riser about one pole spacing unit apart from an adjacent vertical riser, each said runback about one pole spacing unit apart from an adjacent runback, wherein said vertical riser and runback front edges are in an alternating pattern so that each said front edge is about one half a pole spacing unit apart, and wherein:

said circuit breaker is a three-pole circuit breaker having three pairs of line and load terminals, each said line terminal generally vertically aligned with an associated load terminal, each pair of line and load terminals about one pole spacing unit apart from an adjacent pair of line and load terminals, said at least one two plane member includes six separate two plane members;

one said two plane member structured to be coupled to each said line terminal such that said each line terminal two plane member second plate is aligned with one said vertical riser; and one said two plane member structured to be coupled to each said load terminal such that each said load terminal two plane member second plate is aligned with one said runback.

12. The circuit breaker having an offset assembly of claim 11, wherein said two plane members are generally identical.

13. The circuit breaker having an offset assembly of claim 12, wherein each said two plane member second plate has a centerline and each said two plane member first plate has a centerline; and said two plane member second plate centerline and first plate centerline are spaced by about one quarter of a pole spacing unit.

14. The circuit breaker having an offset assembly of claim 11, wherein each said two plane member second plate has a centerline and each said two plane member first plate has a centerline; and said two plane member second plate centerline and first plate centerline are spaced by about one quarter of a pole spacing unit.

15. A power circuit breaker assembly comprising:

a circuit breaker having an offset assembly;

a housing assembly having a bus assembly;

said bus assembly having at least one pair of conductors, said conductors including a vertical riser and a runback, said vertical riser and runback each having a front edge disposed adjacent to and laterally aligned with each other;

a circuit breaker having one or more pairs of circuit breaker terminals, each said terminal having a centerline and said terminal centerlines being vertically aligned with each other;

at least one two plane member having a second plate and a first plate, said first and second plates joined at a edge and extending generally perpendicular to each other;

said second plate structured to be coupled to said quick disconnect;

said first plate structured to be coupled to said circuit breaker terminal so that said second plate is not aligned with the centerline of said circuit breaker terminal;

a quick disconnect coupled to said second plate, said quick disconnect structured to engage a bus assembly conductor;

said first plate coupled to a terminal; and said circuit breaker structured to be coupled to said bus assembly by said quick disconnect.

16. The power circuit breaker assembly of claim 15 wherein:

said circuit breaker structured to move between a first and second position, said first position being outside said housing assembly and said second position being within said housing assembly with said circuit breaker coupled to said bus assembly;

said circuit breaker pair of terminals includes a line terminal and a load terminal;

said at least one two plane member includes two separate two plane members;

one said two plane member structured to be coupled to said line terminal such that said line terminal two plane member second plate is aligned with said vertical riser; and the other said two plane member structured to be coupled to said load terminal such that said load terminal two plane member second plate is aligned with said runback.

17. The power circuit breaker assembly of claim 16, wherein said two plane members are generally identical.

18. The power circuit breaker assembly of claim 15, wherein:

said circuit breaker is a three-pole circuit breaker having three pairs of line and lad terminals, each said line terminal generally vertically aligned with an associated load terminal, each pair of line and load terminals about one pole spacing unit apart from an adjacent pair of line and load terminals, said bus assembly has three vertical risers and three runbacks, each said vertical riser about one pole spacing unit apart from an adjacent vertical riser, each said runback about one pole spacing unit apart from an adjacent runback, said vertical riser and runback front edges are in an alternating pattern so that each said front edge is about one half a pole spacing unit apart;

said at least one two plane member includes six separate two plane members;

one said two plane member structured to be coupled to each said line terminal such that said each line terminal two plane member second plate is aligned with one said vertical riser; and one said two plane member structured to be coupled to each said load terminal such that each said load terminal two plane member second plate is aligned with one said runback.

19. The power circuit breaker assembly of claim 18, wherein said two plane members are generally identical.

20. The power circuit breaker assembly of claim 19, wherein each said two plane member second plate has a centerline and each said two plane member first plate has a centerline; and said two plane member second plate centerline and first plate centerline are spaced by about one quarter of a pole spacing unit.

21. The power circuit breaker assembly of claim 18, wherein each said two plane member second plate has a centerline and each said two plane member first plate has a centerline; and said two plane member second plate centerline and first plate centerline are spaced by about one quarter of a pole spacing unit.

* * * * *